No. 721,917. PATENTED MAR. 3, 1903.
H. C. PRIEBE.
DEVICE FOR CATCHING FOWL.
APPLICATION FILED OCT. 13, 1902.
NO MODEL.
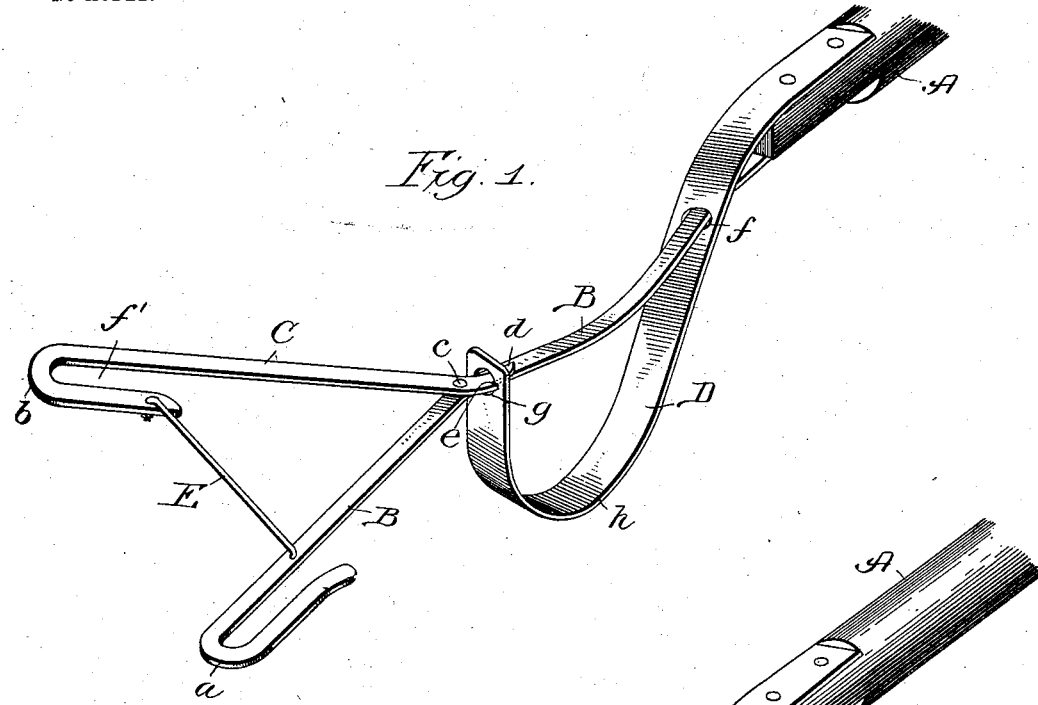
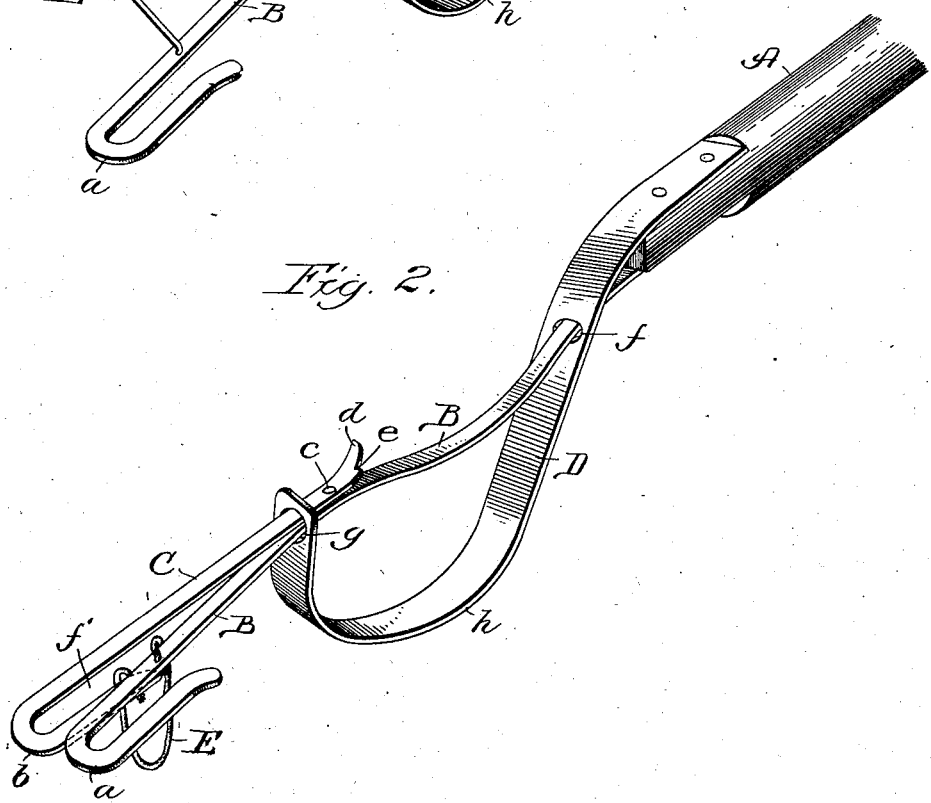
Witnesses.
Inventor:
Herman C. Priebe,
By Dyrenforth, Dyrenforth & Lee,
Att'ys.
THE NORRIS PETERS CO., PHOTO-LITHO., WASHINGTON, D. C.

UNITED STATES PATENT OFFICE.

HERMAN C. PRIEBE, OF BRADFORD, ILLINOIS.

DEVICE FOR CATCHING FOWL.

SPECIFICATION forming part of Letters Patent No. 721,917, dated March 3, 1903.

Application filed October 13, 1902. Serial No. 127,019. (No model.)

*To all whom it may concern:*

Be it known that I, HERMAN C. PRIEBE, a citizen of the United States, residing at Bradford, in the county of Stark and State of Illinois, have invented a new and useful Device for Catching Fowl, of which the following is a specification.

My object is to provide a hand trap device of improved construction for the use of farmers and others to enable them readily to catch fowl, whether they are running upon the ground or roosting in elevated positions. The device is adapted not only to render the catching of the fowl easy of accomplishment, but also to render the operation humane by avoiding danger of injury to the fowl.

In the drawings, Figure 1 is a broken perspective view of the device open, and Fig. 2 a similar view of the device closed.

A is a handle, which may be of any desired length. Fastened to the end of the handle is a stationary rod B of the form shown and provided at its free end with a crook $a$.

C is a rod provided at its free end with a crook $b$ and pivoted to the rod B at $c$. The end of the rod C adjacent to the pivot $c$ is provided with a laterally-inclined cam edge $d$ and a shoulder $e$.

Also fastened upon the end portion of the handle A is a spring D, having an opening $f$, through which the rod B extends, and having an opening $g$ near its free end adapted to slide over the rods B and C. Connected at opposite ends with the rods B C, respectively, is a cord or other flexible strip E.

In operation to set the trap end of the device the spring D is tensioned by retracting its free end in the direction of the handle A, whereby it passes across the pivot $c$. In passing this pivot the opening $g$ engages the cam $d$ to open the jaws of the trap, and the spring then engages the shoulder $e$, which holds the spring tensioned and the jaws opened. When the jaws are open, the cord or the like E extends straight across between the jaws, as shown in Fig. 1. To catch a fowl, the device is thrust at the cord or the like E against its leg, the pressure causing the cord to be bent in the backward direction and to draw the rod or jaw C toward the rod or jaw B, thus releasing the shoulder $e$ from engagement with the spring and permitting the spring to expand and slide along the jaws to close them, as shown in Fig. 2. When the jaws are closed, a space $f'$ remains between them which is greater than the thickness of the fowl's leg near the claw, and this closing of the jaws has the effect of wrapping the cord or the like around the fowl's leg to hold it securely without danger of injury to the fowl. The crook $a$ on the rod or jaw B permits the device to be used when closed to catch fowl by drawing the crook across its leg. The spring at its bend $h$ forms a rest for the device when thrust along the ground and will hold the jaws of the trap at an elevation above the ground which insures proper engagement with the leg of the fowl. The handle may be of such length as to enable the operator to reach fowl roosting in trees or other elevations.

While I prefer to construct the device throughout as shown and described, it may be modified in the matter of details of construction without departing from the spirit of my invention as defined by the claim.

What I claim as new, and desire to secure by Letters Patent, is—

The combination with the handle of a fixed rod B bent along its free end portion to form a crook, a rod C pivoted upon the rod B and shaped to present a crook at its outer end and a cam and shoulder at its inner end, a spring D fastened to the handle and movable at its free end along the said rods, and a cord or the like, E fastened to the rods, all constructed to operate substantially as and for the purpose set forth.

HERMAN C. PRIEBE.

In presence of—
ALBERT D. BACCI,
J. W. DYRENFORTH.